Sept. 12, 1961  B. WEMPE  2,999,316
FINE-ADJUSTMENT DEVICE
Filed Aug. 24, 1959  2 Sheets-Sheet 1

Inventor:
Bernhard Wempe
By *Eric D. Frankel*
Patent Agent

Sept. 12, 1961 B. WEMPE 2,999,316
FINE-ADJUSTMENT DEVICE

Filed Aug. 24, 1959 2 Sheets-Sheet 2

Inventor:
Bernhard Wempe

United States Patent Office 2,999,316
Patented Sept. 12, 1961

2,999,316
FINE-ADJUSTMENT DEVICE
Bernhard Wempe, Wasserlohstrasse 7, Egerer, near
Chieming, Upper Bavaria, Germany
Filed Aug. 24, 1959, Ser. No. 835,526
Claims priority, application Germany Sept. 3, 1958
6 Claims. (Cl. 33—19)

The invention relates to a fine-adjustment device which is particularly suitable for the adjustment of the table of automatic dividing machines without, however, being restricted to this special field of application.

The invention will be explained with reference to the example of an automatic dividing engine but this is not to be interpreted as a limitation. Dividing machines are used primarily to produce graduated scales. The carriage with the engraving or cutting mechanism is roughly set by means of a long dividing screw and then finely adjusted by means of special adjusting devices. In simple dividing machines, a standard scale, the graduation of which is to be transferred to the scale to be divided, is sighted with a microscope connected to the carriage. In automatic dividing engines, the standard scale is scanned in a suitable manner and in accordance therewith the adjustment of the cutting mechanism is carried out mechanically by means of a servo-control.

One of the main problems in the adjustment of the table carrying the standard scale and the scale to be divided is that in view of the friction in the table guides accurate adjustment is difficult because of jerky advance of the table, when accurate adjustments of the order of $1/10\mu$ are required.

Tables are already known which, in principle, permit a frictionless adjustment. These tables consist of a lower part which can be roughly adjusted by means of a spindle; above this lower part is arranged a second table which is connected to the lower table through leaf springs arranged at the sides of this table perpendicular to the required setting direction. The upper table then carries the scales and can be adjusted in its longitudinal direction by exerting a pressure thereon which slightly bends the leaf springs. The adjustment of the resiliently mounted upper table in relation to the spindle-guided lower table was hitherto effected by means of fine-adjusting screws, which may, if desired, be constructed in the form of differential screws and which act on the upper table to bend the leaf springs.

It is further known to use leaf springs, clamped at one end, for the fine adjustment of plane mirrors in optical installations such as interferometers. A force is exerted on the end of the leaf spring remote from the clamping point by means of a micrometer screw, while the mirror to be tilted is actuated by a part of the spring situated in the vicinity of the gripping point in the manner of a one-armed lever. This leaf-spring arrangement permits high transmission ratios and an adjustment which is practically free of play.

The advantages of the table mounting mentioned above and of the setting device working with a leaf spring gripped at one end are, however, largely cancelled out by the fine-adjusting screws co-acting with these devices. Fine-adjusting screws or equivalent devices always have a certain static friction, moreover they are expensive to manufacture and in practice a certain lost motion is inevitable. The above-mentioned drawbacks weigh particularly heavy when the adjustment of the table is to be effected not by hand but by means of a servo-mechanism. In this case it is particularly important that the setting mechanism should have no static friction, that is to say cannot jerk, and that there should be no play on reversal of the setting direction, which might easily lead to oscillation of the servo-control; furthermore, it is important that the setting motor should not have to transmit excessive forces.

When the requirements as regards accuracy are very high, it has further been found that the forces necessary to bend the leaf springs connecting the two parts of the table can lead to deformation of the table arrangement and to reaction forces in the table guide which affect the accuracy.

Finally, disturbances have been noted which have their origin in the vibration caused by the setting motor.

It is the object of the invention to overcome the above-mentioned disadvantages. A fine-adjustment device is to be provided which works without play, which does not require any great setting forces, in which deformation of the adjusted table is avoided, and in which there is no risk of disturbance as a result of vibrations which have their origin in the source of power for the setting means. The device according to the invention is therefore also suitable for purposes in which setting accuracy of less than $1/10$th $\mu$ is required and in which the setting is to be effected by means of a servo-system.

According to the invention, the fine-adjustment device for a table or the like preferably of an automatic dividing machine is characterized by the combination of the following features:

(a) The table consists in known manner of a first table part which can be roughly adjusted in a guide on a base plate by means of a screw spindle or the like, and of a second table part which can be finely adjusted and which is connected to the first table part by means of leaf springs:

(b) Clamped to the first table part is an additional leaf spring which bears, in the vicinity of the clamping point, against an abutment which is connected to the upper table part to be adjusted and which, in a manner known per se, effects a reduction transmission between the deflection of the component to be adjusted and the deflection of a primary setting device which acts on the free end of the additional leaf spring;

(c) the adjustment of the free end of the leaf spring is effected by means of a traction rope;

(d) the traction rope is secured on the one hand to a part of the base plate carrying the whole table, from there runs parallel to the plane of the table, in the setting direction of the table, to a first guide pulley, from there over a second guide pulley, which is mounted one the end of the additional leaf spring, to a third guide pulley and from there, in a continuation of the initial direction, to a winding device.

The first and third guide pulleys are preferably carried by a part of the lower table section which is not guided, at least from the point at which the additional leaf spring is clamped. The first and third guide pulleys are preferably carried by a projecting arm which is secured to the lower table section and to the end of which adjacent to the table is secured the leaf spring. The winding device is preferrably actuated by means of a servo motor which can be mounted on a base other than the base plate carrying the table.

The invention will now be described in more detail with reference to the example of an automatic dividing machine; this example of an embodiment is intended solely to simplify the explanation and not as a limitation.

Figure 1:
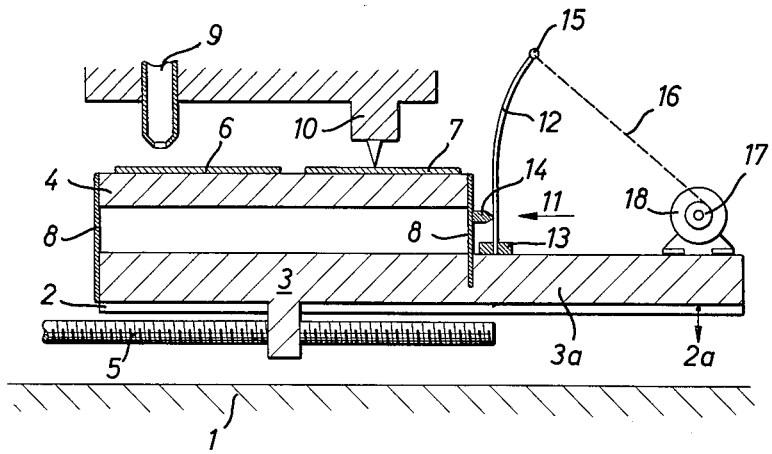
FIGURE 1 is a diagrammatic greatly simplified longitudinal section through a dividing engine which serves to explain the problems on which the invention is based.

FIGURE 1 illustrates diagrammatically and greatly simplified, part of an automatic dividing machine. For the sake of clarity, only the components necessary for an understanding of the invention are included in the drawing. A table arrangement, which will be described in more detail below, is mounted on a base plate 1, which carries the whole dividing machine, by means of suitable guide means, for example by means of rollers or a dovetail. For the sake of clarity, only that part of the guide means, indicated at 2, is shown which is connected to the movable table. The table consists of a lower part 3 and an upper part 4. The lower part can be roughly set by means of a screw spindle 5; the upper part 4, which carries a standard scale 6 and a scale 7 to be graduated, is connected through leaf springs 8 to the lower part and can be finely adjusted in relation to the lower part by bending the leaf springs in known manner. The standard scale 6 can be observed by means of a microscope 9; the graduation of the scale 7 is effected by means of a cutting or engraving mechanism 10, indicated diagrammatically. The arrangement disclosed so far corresponds to the prior art, and in the known case the fine-adjustment of the upper part 4 of the table in relation to the lower part 3, which remained stationary during the fine-adjustment, was effected by means of micrometer of differential screws which act in the direction of the arrow 11.

In the arrangement according to the invention, an additional leaf spring 12, which is clamped by suitable means 13 to the lower part 3 of the table, is provided for the fine adjustment of the upper part of the table 4. A somewhat less satisfactory arrangement is obtained if the leaf spring is replaced by a corresponding lever which is mounted free of play for example by means of a tensioning strip. The leaf spring 12 bears, at a point comparatively close to the clamping point 13, against an abutment 14, which is provided on the upper part 4 of the table or on one of the leaf springs 8. Acting on the free end 15 of the spring is a traction rope which causes a bending of the spring and hence a fine adjustment of the upper section 4 of the table. The traction rope 16 may be wound onto or unwound from a winding drum 17 which is mounted on the shaft of a servo motor 18. In an automatic dividing machine, the servo motor 18 is controlled in a suitable manner so that the microscope 9 is set precisely to the required division mark of the standard scale, but this servo-control which may, if necessary, be replaced by optical reading and manual adjustment, does not form part of the invention and therefore need not be described in detail.

It is clear that the arrangement described in connection with FIGURE 1 renders possible a frictionless fine-adjustment of the upper part 4 of the table. The transmission ratio of the forces between the upper end 15 of the spring 12 and the point of action at the abutment 14 can be made very great in practice so that the servo motor 18 can transmit considerable forces to the table while requiring little power. Since only the constant magneto-dynamic forces exerted by the motor act on the traction rope and no intermediate members subject to static friction are interposed, this device permits an adjustment which is completely continuous and which can be used even with setting accuracies of less than $1/10\mu$.

Nevertheless, it has been found that when the demands as regards accuracy are extremely high, faults may arise as a result of the fact that the table 3 is deformed by the forces exerted by the traction rope 16. In this case, the corresponding portion 3a of the table 3 is bent upwards so that reaction forces occur in the guide means as indicated by the arrow 2a. As a result of the reaction forces acting on the guide means, errors occurred in practice which, in the worst case, amounted to up to $1/2\mu$. In addition, disturbances occurred as a result of vibrations caused by the motor 18.

Figure 2:
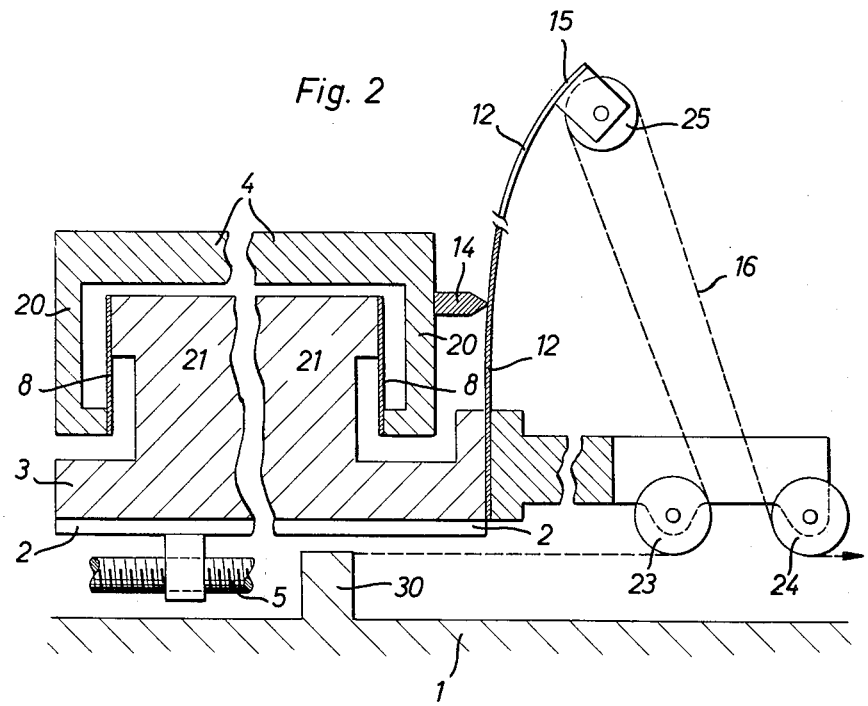
FIGURE 2 is an embodiment according to the invention which is an improvement over FIGURE 1.

These disadvantages are avoided by the improved embodiment shown in FIGURE 2 which also illustrates an arrangement of the upper and lower parts of the table which is more favourable in practice. The upper section 4 of the table is provided with downwardly extending lateral portions 20 which extend below an upwardly projecting portion 21 of the table 3. The leaf springs 8 are secured to the lower section of the lateral portions 20 and to the upper portion 21 of the table 3 in such a manner that they are subjected to tension, that is to say that the upper part of the table 4 is suspended from the lower part. In this case it may be an advantage to bias the leaf springs in such a manner that, on bending for the fine adjustment of the upper part 4 they do not pass through their released position of rest. This can be achieved as a result of the fact that, when the table 4 is in the position of rest in relation to the lower part 3, the springs are both pressed inwardly or drawn outwardly, and this has the advantage that the springs are prevented from snapping over on passing through the position of rest (cri-cri effect). This will generally be the case with the life spring 12 without any additional measures because the traction rope 16 can only act in one direction.

In order to eliminate reaction forces on the guide means 2 for the lower part 3 of the table, a projecting member 22 is provided at the end of the table 3 which carries two guide pulleys 23 and 24. The leaf spring 12 is clamped to the projecting member 22 or between this member 22 and the part 3 of the table. At its upper end 15, it carries a further guide pulley 25.

In the arrangement shown in FIGURE 2, the reaction forces may be avoided as a result of the fact that the guide means 2 is allowed to extend no further than below the clamping point 13 for the spring 12 so that the part of the table between the clamping point 13 and the end on motor side is not guided and is free to move upwards under the influence of the forces exerted by the rope 16.

Figure 3:
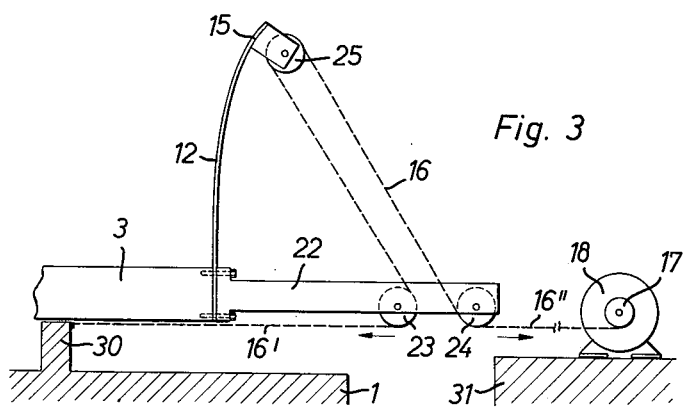
FIGURE 3 is a more accurate illustration of the guide means for the traction rope in the arrangement shown in FIGURE 2.

FIGURE 3 illustrates more accurately the guide means for the traction rope serving to adjust the leaf spring 12. The one end of the rope 16, which is preferably in the form of a steel band, is secured to a corresponding projection 30 on the base plate 1. It runs in the direction of displacement of the table 3, parallel to the plane of the table, as far as a first guide pulley 23, from there to a second guide pulley 25 which is mounted at the end 15 of the spring 12, parallel back to a third guide pulley 24 and from there, in a continuation of the initial direction, to a winding drum 17. The winding device and the associated driving motor 18 are preferably mounted on a separate base member 31 in order to avoid vibration of the dividing engine, the base plate 1 and the base member 31 together thus constituting a base means for supporting the apparatus. Temperature influences on the mounting, the rope 16 and the spring 12 have no effect because the servo device is automatically controlled in such a manner that the graduation in question is always in coincidence with the setting device.

As a result of the arrangement illustrated in FIGURE 3, the following effect is obtained:

The forces exerted on the spring 12 by the motor 18, which forces lead to the required bending of the spring and hence to the setting of the upper part 4 of the table are limited to the region of the spring 12, of the traction rope 16, between the guide pulley 23 over the guide pulley 25 to the guide pulley 24 and the projecting member 22. As a result, no reaction forces can occur on the guide means. The traction forces exerted by the rope section 16 leading to the pulley 23 and the rope section 16" leaving the pulley 24 are oppositely directed and cancel each other out. In practice, the carriage 3 can be displaced absolutely freely. No bending forces, which might lead to dividing errors, can be exerted on the guided portion of the table as a result. Any deformation of the projecting member 22 has no effect.

The device described can be adapted to other applications with minor modifications. For example, it can be used in a multiple arrangement thus rendering possible an adjustment for a plurality of coordinates; and it may also be used, for example, to adjust a comparator table; the device may also be used for a transverse adjustment of the table such as is provided, for example, in dividing engines in which the scales are arranged not one behind the other but side by side. In such dividing engines, Abbe's comparator principle is not fulfilled, by means of which tilting errors of the first order as a result of imperfect rectilinear guiding can be eliminated. It is then necessary to re-adjust the table in the transverse direction about a pivot point situated substantially at the end of the table, when the rectilinear guiding is imperfect; this is effected by autocollimation by means of a mirror which is mounted on the table perpendicular to the scales. In general, the device according to the invention can be used whenever a component has to be very accurately adjusted by extremely small amounts either by means of a motor or by hand.

What I claim is:

1. A fine adjustment device, comprising, in combination: a base means; a movable table; means for guiding the movement of said table along said base means; a screw spindle connected to said table for moving the latter along said guiding means; said table including a lower table part, an upper table part, leaf springs connecting said table parts for friction-free movement therebetween, and an abutment connected to the upper table part; an additional leaf spring clamped to said lower table part and bearing against said abutment in the vicinity of the clamping point; means connected to the free end of said additional leaf spring for adjusting the position of said spring and thus the position of the upper table part with respect to the lower table part, the distance between said means and the abutment being greater than the distance between the clamping point and the abutment, said adjusting means including a first guide pulley, a second guide pulley on the end of the additional leaf spring, a third guide pulley, said first and third pulleys being on said table, a winding device on said base means, and a traction rope secured on one end to the base means, extending parallel to the plane of the table to said first pulley, over said second pulley to the third pulley, and then extending parallel to the plane of the table to said winding device.

2. A device as claimed in claim 1, wherein at least the portion of the lower table part from the clamping point to the end thereof is free of said guide means, said first and third guide pulleys being carried by said portion of the lower table part.

3. A device as claimed in claim 1, comprising a projecting member secured at one end to the lower table part, said leaf spring being secured to said one end of the projecting member, said first and third pulleys being carried by said projecting member.

4. A device as claimed in claim 1, wherein said rope is in the form of a steel band.

5. A device as claimed in claim 1, comprising a servo motor for actuating said winding device.

6. A device as claimed in claim 5, wherein said base means comprise a separate base member having the winding device and servo motor mounted thereon.

No references cited.